United States Patent [19]

Houga

[11] Patent Number: 5,635,675
[45] Date of Patent: Jun. 3, 1997

[54] BENDABLE PROTECTIVE TUBE FOR BURIED CABLES

[75] Inventor: Morinobu Houga, Nagoya, Japan

[73] Assignee: Maruho Sangyo Kabushiki Kaisha, Nagoya, Japan

[21] Appl. No.: 325,375

[22] PCT Filed: Apr. 28, 1994

[86] PCT No.: PCT/JP94/00715

§ 371 Date: Oct. 26, 1994

§ 102(e) Date: Oct. 26, 1994

[87] PCT Pub. No.: WO95/10872

PCT Pub. Date: Apr. 20, 1995

[30] Foreign Application Priority Data

Oct. 14, 1993 [JP] Japan ...................... 5-257104

[51] Int. Cl.⁶ .................................................. F16L 11/00
[52] U.S. Cl. ......................... 174/68.3; 59/78.1; 138/120
[58] Field of Search ......................... 174/68.1, 68.3, 174/136; 138/118, 121, 120; 59/78.1

[56] References Cited

U.S. PATENT DOCUMENTS

| 2,784,989 | 3/1957 | Krupp | 285/368 |
| 5,027,665 | 7/1991 | Hayward | 138/121 |

FOREIGN PATENT DOCUMENTS

| 0422670 | 7/1948 | Italy | 174/68.3 |
| 50-33820 | 11/1975 | Japan . | |
| 57-143474 | 8/1982 | Japan . | |
| 4-54814 | 2/1992 | Japan . | |
| 0434215 | 11/1974 | U.S.S.R. | 138/118 |

*Primary Examiner*—Hyung S. Sough
*Attorney, Agent, or Firm*—Jacobson, Price, Holman & Stern, PLLC

[57] ABSTRACT

A bendable protective tube for buried cables, wherein a plurality of cylindrically formed highly rigid resin tube bodies are connected together unitarily via cylindrical resin nodes bent so as to have a substantially S-shaped cross section. Each of the nodes has a rigid portion and a deformable portion covered with and protected by the rigid portion. Owing to this structure, the deformable portion of the node is freely deformable. The protective tube as a whole has a flexibility, and an external force is restricted to be imparted to the deformable portion by the rigid portion.

2 Claims, 5 Drawing Sheets

BENDABLE PROTECTIVE TUBE FOR BURIED CABLES

TECHNICAL FIELD OF THE INVENTION

This invention relates to a bendable protective tube for buried cables which is used to protect from earth and sand and water an electric cable, such as a power line buried under the ground.

BACKGROUND OF THE INVENTION

A three dimensionally bent tube consisting a conventional protective tube of this kind for buried cables generally consists of a combination of hard two-dimensionally bent tubes having a predetermined radius of curvature (for example, 3 mR, 5 mR and 10 mR), or a hard corrugated polyethylene tube, or a mechanically bent metal tube. However, when such tubes are employed, it is necessary to select bent tubes of a plurality of radii of curvature and cover cables therewith by giving consideration to the directions in which these tubes are bent. Consequently, much labor and technical skill are required. When hard corrugated polyethylene tubes are used, a worker damages a cable in some cases by accidentally piercing his pickax through a thin-walled portion thereof during a cable burying operation.

When metal tubes are used, it is necessary to carry a bending machine into a construction field and repeatedly field-adjust the radii of curvature and bending directions of the metal tubes, so that complicated operations are necessarily carried out in a cable burying place. Consequently, much labor is required, and a construction period is prolonged. Moreover, once in a long while, pipes laid underground are damaged in error by working tools during the engineering work for water supply pipes, sewerage pipes and gas pipes.

SUMMARY OF THE INVENTION

In view of the facts described above, a principal object of the present invention is to provide a bendable protective tube for buried cables, capable of reducing the labor in a cable burying place and a construction period.

The present invention provides a bendable protective tube 1 for buried cables, comprising a plurality of cylindrically formed highly rigid resin tube bodies 4 connected to one another unitarily via resin nodes 5 which are cylindrically bent so as to have a substantially S-shaped cross section, each of the nodes being composed of a rigid portion 2 and a deformable portion 3 covered with and protected by the rigid portion.

These reference numerals are used for the convenience's sake to denote elements corresponding to those shown in the drawings, and the present invention is not limited to what are shown in the drawings.

Owing to the above-described construction, the deformable portions 3 of the nodes 5 are freely deformable, and as a whole for buried cables has a flexibility, the action of an external force imparted to the deformed portions being prevented or arrested by the rigid portions 2.

BEST MODE FOR CARRYING OUT THE INVENTION

Figure 1A:
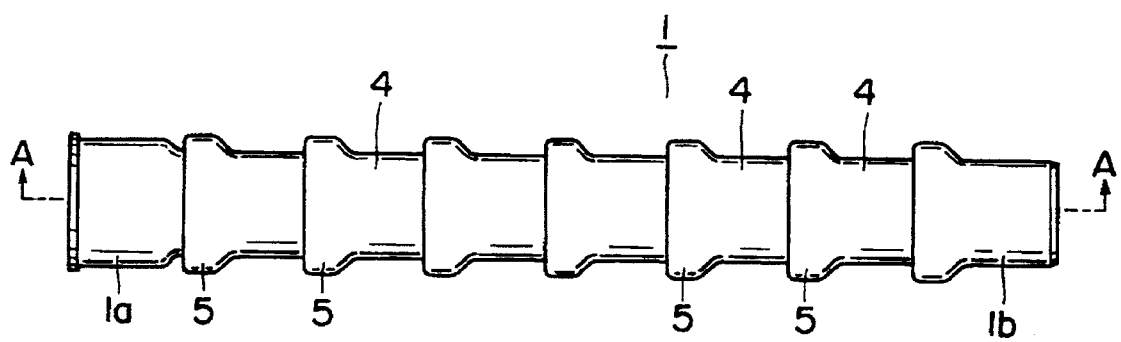
FIG. 1A is a front elevation of a bendable protective tube for buried cables according to the present invention 1.
Figure 1B:
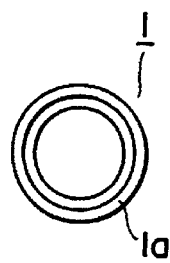
FIG. 1B is a sectional view of the bendable protective tube for buried cables shown in FIG. 1A.
Figure 2:
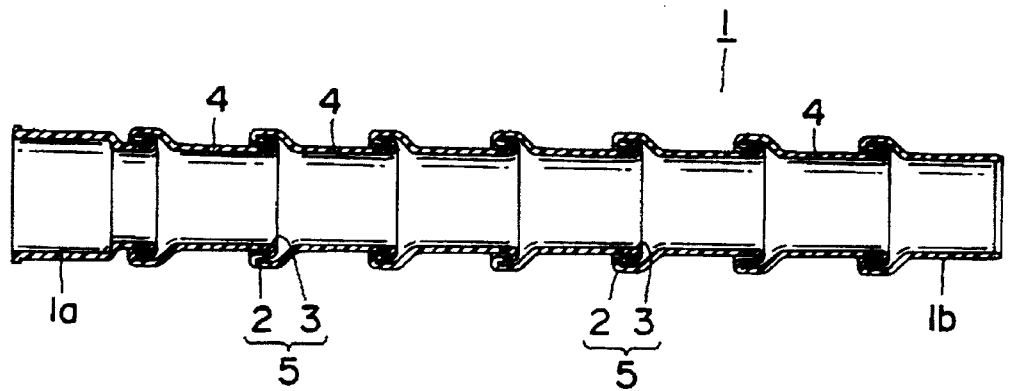
FIG. 2 is a sectional view taken along the line A-A in FIG. 1A of the bendable protective tube for buried cables.

Referring to FIGS. 1A, 1B and 2, a bendable protective tube 1 for buried cables has a plurality (for example, eight in the embodiment of FIGS. 1A and 2) of substantially cylindrical tube bodies 4 made of a hard resin (hard vinyl chloride resin), and these tube bodies 4 are connected to one another unitarily via nodes 5 which are bent so that a part of each of the walls thereof has a substantially S-shaped (or, conversely, Z-shaped) cross section.

This node 5 has a rigid portion 2 positioned on the outer side and formed out of a hard resin (hard vinyl chloride), and a deformable portion 3 positioned on the inner side of the rigid portion 2 and formed unitarily with the rigid portion and out of a soft resin (soft vinyl chloride resin). Since this deformable portion 3 has a flexibility, it is freely deformable, the deformable portion being covered with and protected by the rigid portion 2 provided on the outer side thereof as shown in FIG. 2. The bendable protective tube 1 for buried cables has a socket 1a at one end portion (left end portion of FIG. 1A) thereof, and a spigot 1b at the other end portion (right end portion of FIG. 1A) thereof, and the same or another type of conduits (not shown) can be connected in order via the socket 1a and spigot 1b by using packings (not shown) as necessary.

Figure 3A:
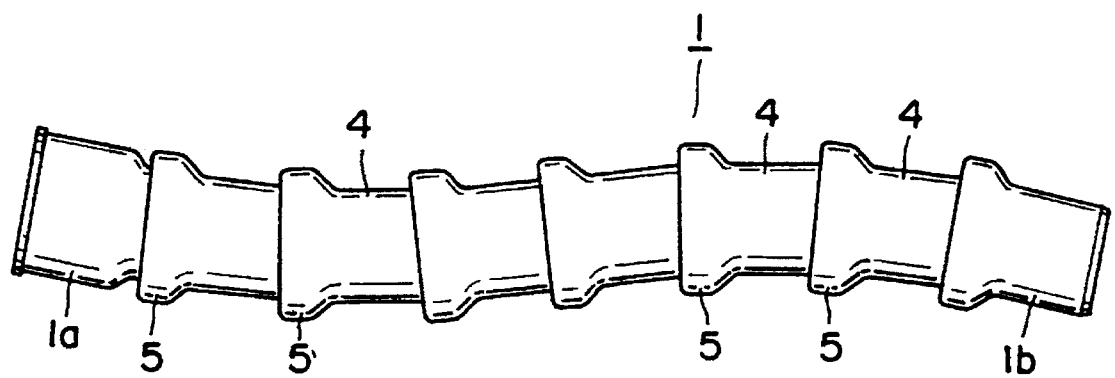
FIG. 3A is a front elevation of the bendable protective tube in a bent state for buried cables shown in FIG. 1.

Since the bendable protective tube 1 for buried cables according to the present invention has the above-described construction, it can, of course, be laid linearly as shown in FIG. 1A. Moreover, the deformable portions 3 of the nodes 5 are deformed freely, so that the bendable protective tube 1 as a whole for buried cables has a flexibility. Accordingly, the bendable protective tube can be laid in a three-dimensionally bent state as shown in FIG. 3A.

Since the deformable portion 3 of the nodes 5 are covered with and protected by the rigid portions 2, there is not the possibility that the deformable portions 3 are damaged by an external force, such as the earth pressure after a cable has been buried under the ground even when the cable is laid in a linearly extending state or in a three-dimensionally bent state.

In order to bury this bendable protective tube 1 for buried cables, it may be merely laid under the ground in a construction field so as to extend linearly or in a three-dimensionally bent state, and this tube does not require, unlike a known protective tube used in a conventional cable burying method, to firmly connect a plurality of bent pipes to each other. Therefore, the labor in a cable burying place and a construction period can be reduced, and a cable burying operation can be carried out economically.

Figure 3B:
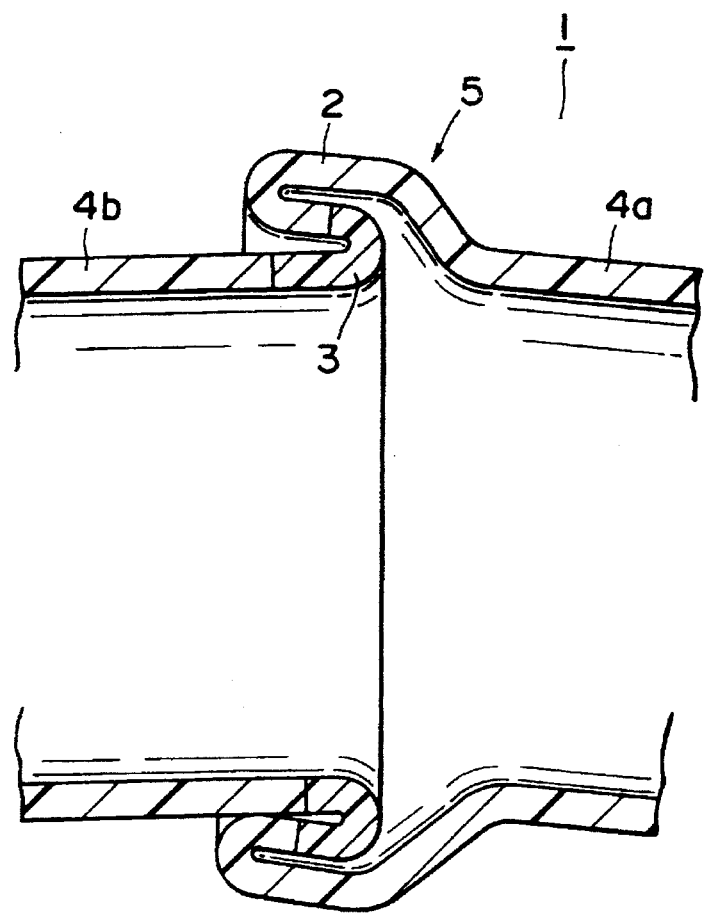
FIG. 3B is an enlarged section of a part of the bendable protective tube for buried cables shown in FIG. 3A.

In this embodiment, the rigid portion 2 is positioned on the outer side and a deformable portion 3 is positioned on the inner side to constitute a substantially S-shaped node 5 by which cylindrical tube bodies 4 (first and second tube bodies 4a, 4b) are connected together as shown on an enlarged scale in FIG. 3B, and the rigid portion 2 is formed of a hard resin only and the deformable portion 3 is formed of a soft resin only, but the present invention is not limited to this embodiment. Various other modes of embodiments are conceivable as shown in FIGS. 4, 5 and 6.

Figure 4:
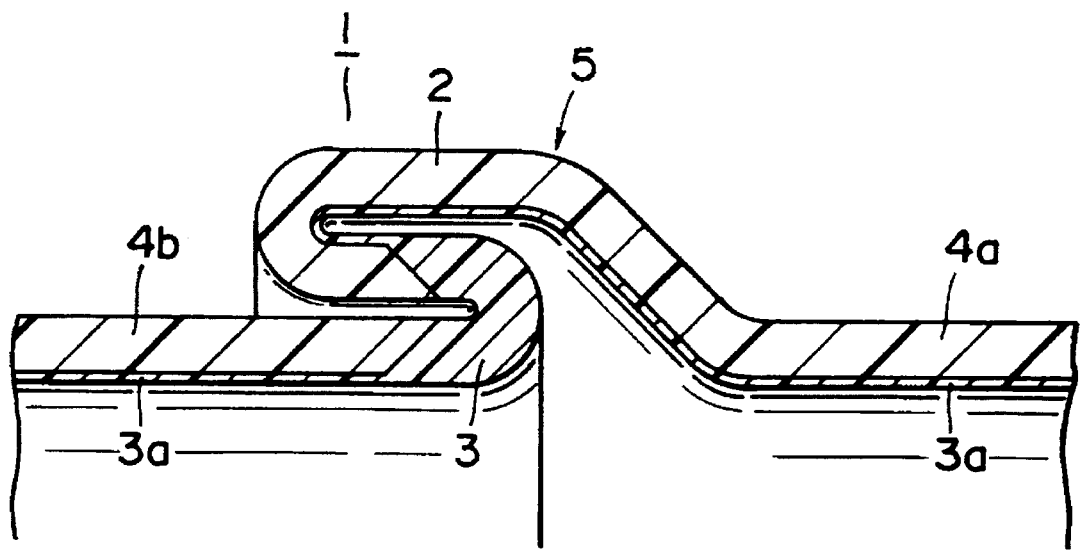
FIG. 4 is an enlarged section of a node of a bendable protective tube for buried cables according to a second embodiment of the present invention.
Figure 5:
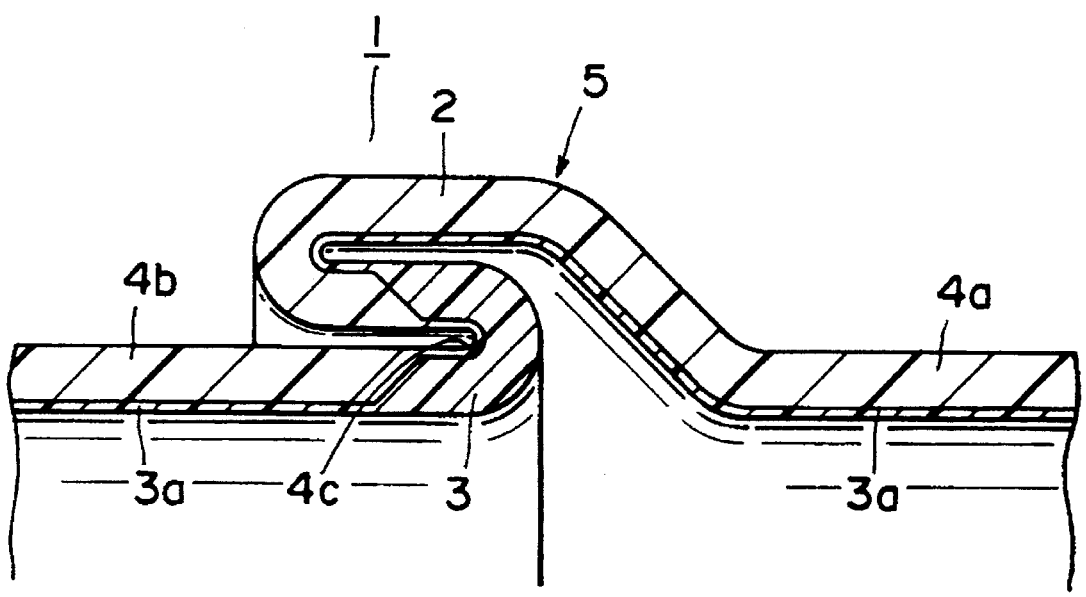
FIG. 5 is an enlarged section of a node of a bendable protective tube for buried cables according to a third embodiment of the present invention.

In the embodiments of FIGS. 4 and 5, tube bodies 4 (first and second tube bodies 4a, 4b) and a rigid portion 2, which is positioned on the outer side, of a node 5 are formed by pasting a soft resin sheet (shown by narrowly hatched lines) on an entire inner surface of a hard resin portion (shown by widely hatched lines) so as to have a film layer 3a of a soft resin. In the structure of FIG. 4, a deformable portion 3, which is positioned on the inner side, of the S-shaped node 5 is formed out of a soft resin only, and, in the structure of FIG. 5, a film 4c of a hard resin is formed as an extension of a rigid portion 2 on and unitarily with an outer surface of a deformable 3which constitutes an inner part of the node 5.

Figure 6:
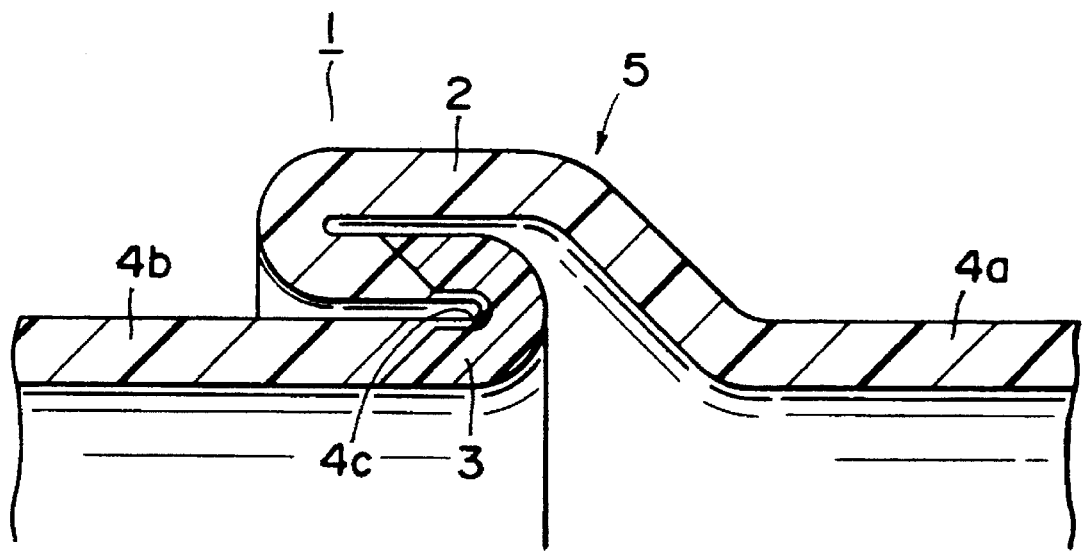
FIG. 6 is an enlarged section of a node of a bendable protective tube for buried cables according to a fourth embodiment of the present invention.

When the deformable portion 3, one of the parts of the node 5 and positioned on the inner side, is formed, a sheet of a hard resin (shown by widely hatched lines) is pasted on an outer surface of the film of a soft resin (shown by narrowly hatched lines) to form a film 4c of a hard resin as an extension of a rigid portion 2 on the outer side of and unitarily with the deformable portion 3 as shown in FIG. 6 and FIG. 5. As is clear from the drawings, soft resin portions (i.e., the deformable portion 3 and film layer 3a) are formed on the entire inner side of a tube body 4 and node 5, which are made of a hard resin, as described above in the structure of FIG. 5, while a part made of a soft resin is only a deformable portion constituting an inner portion of the node 5 in the structure of FIG. 6.

Figure 7:
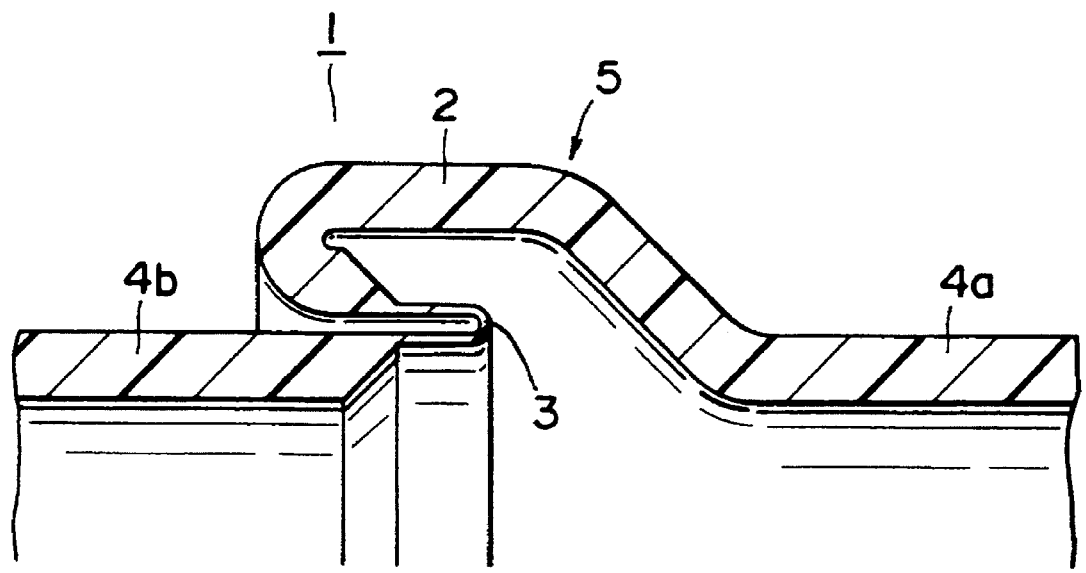
FIG. 7 is an enlarged section of a node of a bendable protective tube for buried cables according to a fifth embodiment of the present invention.

In FIG. 7 which shows a further embodiment of the present invention, a bendable protective tube 1 for buried cables is entirely formed out of a hard resin, and a deformable portion 3 only of a node 5 is formed to a small thickness so as to increase the flexibility thereof. This structure is substantially similar with the structure of FIG. 6 except that the deformable portion 3 of a soft resin is removed.

Figure 8:
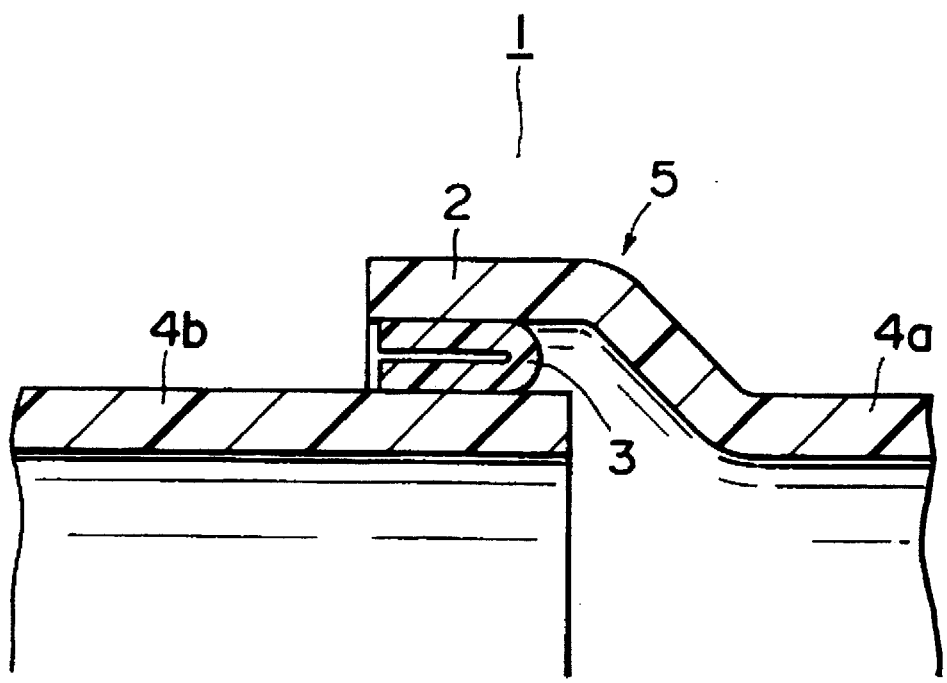
FIG. 8 is an enlarged section of a node of a bendable protective tube for a sixth embodiment of the present invention.

FIG. 8 shows still another embodiment of the invention. In this embodiment, a tube body 4a having a rigid portion 2 of a node 5 is formed integrally in advance and another tube body 4b not provided with rigid portion such as the rigid portion 2 is formed separately. Separately from these tube bodies 4a, 4b, a cylindrical member is obtained by bending a cylindrically formed soft resin so as to have a U-shaped cross section, and it is inserted between and fused unitarily to the tube body 4b and the rigid portion 2 of the other tube body 4a, the resultant part constituting a deformable portion 3.

As described above, the present invention is directed to a bendable protective tube 1 for buried cable which is obtained by connecting a plurality of cylindrically formed highly rigid resin tube bodies 4 together unitarily via cross-sectionally S-shaped cylindrically bent resin nodes 5. Since each node 5 has a rigid portion 2 and a deformable portion 3 covered with and protected by the rigid portion 2, the deformable portion 3 of the node 5 is freely deformable. Therefore, the bendable protective tube 1 as a whole for buried cables has a flexibility, and the rigid portion 2 prevents an external force from being imparted to the deformable portion 3. Moreover, since this bendable protective tube has an integral structure, it is evident that this tube can prevent the entry of water, such as spring water thereinto. Owing to this structure, a desired three-dimensionally bendable protective tube for buried cables can be provided, and labor in a cable burying construction field can be reduced. This enables a construction term to be reduced. Owing to the flexibility of the protective tube, concentrated stress occurring due to the displacement of subsoil, such as soft subsoil is absorbed therein or alleviated, so that damage to the tube can be prevented.

What is claimed is:

1. A bendable protective tube for buried cables, wherein a plurality of cylindrical rigid resin tube bodies are connected together through cylindrical nodes, comprising:

a first cylindrical tube body, a second cylindrical tube body, and a node having a substantially S-shaped cross section for connecting said first and second cylindrical tube bodies together unitarily, said substantially S-shaped node having a rigid portion formed by extending said first tube body and a deformable portion formed unitarily with said second tube body and positioned on an inner side of said rigid portion, said rigid portion of the S-shaped node including a spigot end on said first tube body oriented in concentric spaced relation to an end of said second tube body, said rigid portion of the S-shaped node including a reversely curved free end on the spigot end of said first tube body, said deformable portion of the S-shaped node being of J-shaped configuration including a short leg and a long leg interconnected by a bight portion, the end of the short leg being unitarily joined with the end of the reversely curved rigid portion of said first tube body, the end of the long leg of the deformable portion being connected to the end of said second tube body.

2. A bendable protective tube for buried cables, wherein a plurality of cylindrical rigid resin tube bodies are connected together through cylindrical nodes, comprising:

a first cylindrical tube body, a second cylindrical tube body, and a node having a substantially S-shaped cross section for connecting said first and second cylindrical tube bodies together unitarily, said substantially S-shaped node having a rigid portion formed by extending said first tube body and positioned on an outer side of said rigid portion, and a deformable portion formed unitarily with said second tube body and positioned on an inner side of said rigid portion, said first tube body including a spigot end, said rigid portion of the S-shaped node including a reversely curved free end on the spigot end of said first tube body oriented in spaced concentric relation to an end of said second tube body, said deformable portion of the S-shaped node having a U-shaped transverse cross-section with the ends of the U-shaped deformable portion being connected to the end of the reversely curved rigid portion of said first tube body and an end of said second tube body, and a film extending from the remote peripheral edges of the U-shaped deformable member along the inner surface of said second tube body and along the inner surface of said rigid portion of the S-shaped node and the first tube body.

* * * * *